(12) United States Patent
VanderVeen et al.

(10) Patent No.: US 8,181,451 B2
(45) Date of Patent: May 22, 2012

(54) METHOD OF CONTROLLING THE OPERATION OF A SELECTIVE CATALYTIC REDUCTION PLANT

(75) Inventors: David P. VanderVeen, Alcoa, TN (US); Scott A. Boyden, Bellingham, WA (US)

(73) Assignee: ALSTOM Technology Ltd, Baden (CH)

( * ) Notice: Subject to any disclaimer, the term of this patent is extended or adjusted under 35 U.S.C. 154(b) by 788 days.

(21) Appl. No.: 12/274,849

(22) Filed: Nov. 20, 2008

(65) Prior Publication Data
US 2010/0122526 A1 May 20, 2010

(51) Int. Cl.
 *F01N 3/00* (2006.01)
 *F01N 3/10* (2006.01)
 *F23J 15/00* (2006.01)
 *F23J 11/00* (2006.01)

(52) U.S. Cl. ............. 60/295; 60/301; 110/203; 110/345

(58) Field of Classification Search ............... 60/273, 60/274, 276, 286, 295, 301, 303; 110/203, 110/345; 422/105, 107, 108, 110
See application file for complete search history.

(56) References Cited

U.S. PATENT DOCUMENTS

| | | | | |
|---|---|---|---|---|
| 5,576,970 | A | * | 11/1996 | Goto .............................. 700/274 |
| 5,813,212 | A | | 9/1998 | Oguchi et al. |
| 6,742,330 | B2 | | 6/2004 | Genderen |
| 2004/0098974 | A1 | | 5/2004 | Nieuwstadt et al. |

FOREIGN PATENT DOCUMENTS

| | | |
|---|---|---|
| EP | 0 604 236 | 4/1997 |
| EP | 0 604 236 B1 | 4/1997 |
| WO | WO 2008009940 A2 * | 1/2008 |

OTHER PUBLICATIONS

PCT International Search Report and the Written Opinion of the International Searching Authority, dated Mar. 30, 2010—(PCT/US2009/063544).

* cited by examiner

*Primary Examiner* — Thomas Denion
*Assistant Examiner* — Audrey K Bradley
(74) *Attorney, Agent, or Firm* — Rita D. Vacca (57) ABSTRACT

A method of controlling the feeding of a reducing agent, such as urea or ammonia, to a selective catalytic reduction reactor, which is operative for removing NOx from a process gas of a process plant, comprising the steps of estimating a present value of at least one predetermined parameter which is indicative of the amount of NOx that needs to be removed from said process gas in the selective catalytic reduction reactor. The rate of increase of said at least one predetermined parameter is then estimated. When said estimated rate of increase of said at least one predetermined parameter is found to be positive, the amount of said reducing agent being supplied is increased to a higher value than would be the case if said at least one predetermined parameter were to be kept constant at the estimated present value thereof.

16 Claims, 5 Drawing Sheets

METHOD OF CONTROLLING THE OPERATION OF A SELECTIVE CATALYTIC REDUCTION PLANT

FIELD OF THE INVENTION

The present invention relates to a method of controlling the feeding of a reducing agent, such as urea or ammonia, to a selective catalytic reduction reactor which is operative for removing NOx from a process gas of a process plant, such as a combustion plant or an incineration plant, said controlling the feeding of the reducing agent comprising estimating a present value of at least one predetermined parameter which is indicative of the amount of NOx that needs to be removed from said process gas in the selective catalytic reduction reactor.

The present invention further relates to a device for controlling the feeding of a reducing agent, such as urea or ammonia, to a selective catalytic reduction reactor which is operative for removing NOx from a process gas of a process plant.

BACKGROUND OF THE INVENTION

In the combustion of a fuel, such as coal, oil, natural gas, peat, waste, etc., in a combustion plant, such as a power plant or a waste incineration plant, process gases are generated. For separating nitrogen oxides, usually denoted NOx, from such process gases, often referred to as flue gases, a method is frequently used, in which a reducing agent, usually ammonia or urea, is mixed with the flue gases. The flue gases, mixed with said ammonia or urea, are then passed through a catalyst in which the ammonia reacts selectively with the NOx to form nitrogen gas and water vapour. Usually the catalyst is installed in a so called Selective Catalytic Reduction reactor (SCR-reactor).

In many processes, in particular waste incineration plants and peak load power plants, the load of NOx that needs to be handled by the SCR-reactor varies heavily over time. The variations in NOx load depend, in particular, on varying fuel qualities and varying supply, i.e., varying load, of fuel to the waste incineration plant or the power plant.

EP 0 604 236 B1 describes a power plant utilizing a gas turbine. It is recognized, in EP 0 604 236 B1, that the standard technique of controlling the dosage of ammonia to the flue gases, upstream of the SCR-reactor, is to measure the concentration of NOx downstream of the SCR-reactor and to utilize a feed-back control for controlling the dosage of ammonia to the flue gases. EP 0 604 236 B1 notes that such a system has a very slow response time to load changes. EP 0 604 236 B1 proposes to utilize a feed-forward controller which controls the supply of ammonia based on a measurement of the concentration of NOx upstream of the SCR-reactor.

Even with the feed-forward control of EP 0 604 236 B1 the response to load changes is sometimes not quick enough, which can result in an emission, to the ambient air, of NOx or ammonia which is in an amount that is above the emission limit, which has been set by an environmental authority.

SUMMARY OF THE INVENTION

An object of the present invention is to provide a method of controlling the supply of a reducing agent, such as ammonia or urea, to an SCR-reactor, which method is capable of handling quick variations in the amount of NOx in the process gases.

This object is achieved by a method according to the preamble and comprising the steps of estimating a rate of increase of at least one predetermined parameter, increasing, when said estimated rate of increase is positive, the dosage of said reducing agent to a higher value than what would be the case if said at least one predetermined parameter was kept constant at the estimated present value.

An advantage of this method is that it provides for quick response to changes in the inlet amount of NOx to the SCR catalyst. The method of temporarily overdosing the reducing agent, compared to what would be needed at the same, but constant, inlet amount of NOx, prepares the SCR catalyst for the coming higher inlet amount of NOx, such that the removal efficiency is kept high also during the period when there is an increasing inlet amount of NOx. An SCR catalyst comprises active sites on which elements, such as molecules, of the reducing agent may temporarily bind. Thus the SCR catalyst has a capability of storing reducing agent on active sites thereof. This capability of storing reducing agent is utilized in the present method as a means of improving the control of the dosage of the reducing agent when the amount of NOx changes. It can be said that the catalytic reduction reactor functions as a "sponge" which may absorb or release elements, such as the molecules, of the reducing agent. The aforedescribed method utilizes this effect to improve the efficiency of the selective catalytic reduction reactor. A selective catalytic reduction reactor used in the present method could typically comprise vanadium pentoxide, $V_2O_5$, and/or wolfram trioxide, $WO_3$, as active ingredients, which have been added to a ceramic base material, such as, for instance, a honeycomb ceramic carrier.

According to one embodiment of the present invention, said method further comprises decreasing, when said estimated rate of increase is negative, the dosage of said reducing agent to a lower value than what would be the case if said at least one predetermined parameter was kept constant at the estimated present value. An advantage of said one embodiment of the present invention is that the method of temporarily under-dosing the reducing agent, compared to what would be needed at the same, but constant, inlet amount of NOx, prepares the SCR catalyst for the coming lower inlet amount of NOx, such that the slip of reducing agent, e.g., ammonia, is kept low also during the period when there is a decreasing inlet amount of NOx.

According to another embodiment of the present invention, said method further comprises comparing said estimated rate of increase to an upper limit value, and increasing, when said estimated rate of increase exceeds said upper limit value, the dosage of said reducing agent to a higher value than what would be the case if said at least one predetermined parameter was kept constant at the estimated present value. An advantage of said another embodiment of the present invention is that the overdosing of the reducing agent can be set to occur only when the inlet amount of NOx increases rapidly, which is when the method of overdosing the reducing agent is most effective, whereas situations that involve slow increases in the inlet amount of NOx can be handled without overdosing.

According to yet another embodiment of the present invention, said method said method further comprises comparing said estimated rate of increase to a lower limit value, and decreasing, when said estimated rate of increase is lower than the lower limit value, the dosage of said reducing agent to a lower value than what would be the case if said at least one predetermined parameter was kept constant at the estimated present value. An advantage of said yet another embodiment of the present invention is that the under-dosing of the reducing agent can be set to occur only when the inlet amount of NOx decreases rapidly, which is when the method of under-dosing is most effective, whereas situations that involve slow decreases in the inlet amount of NOx can be handled without underdosing.

According to one embodiment of the present invention, said predetermined parameter comprises the mass flow of NOx of the process gas at a location upstream of the selective catalytic reduction reactor. According to a further embodiment of the present invention, said predetermined parameter is related to the load of the process plant.

According to yet a further embodiment of the present invention, said at least one predetermined parameter is utilized in a feed-forward mode such as to thereby control the feeding of the reducing agent.

According to the preferred embodiment of the present invention, an effect of overdosing the reducing agent, as described hereinbefore, is later compensated for, when an amount of reducing agent has been overdosed, by decreasing the dosage of said reducing agent to a lower value than what would be the case if said at least one predetermined parameter was kept constant at the estimated present value. An advantage of this preferred embodiment of the present invention is that the total amount of reducing agent supplied is kept at such a level that slip of reducing agent, such as ammonia, from the SCR reactor is minimized.

Said estimating the rate of increase of said at least one predetermined parameter could include calculating the derivative of said at least one predetermined parameter. Calculating the derivative of said at least one predetermined parameter provides a simple way of estimating how quickly the inlet amount of NOx changes, and whether it is an increase or a decrease in the inlet amount of NOx.

The above referenced object may also be achieved by means of a further method of the present invention according to the preamble and comprising the steps of estimating a rate of increase of said at least one predetermined parameter, decreasing, when said estimated rate of increase is negative, the dosage of said reducing agent to a lower value than what would be the case if said at least one predetermined parameter was kept constant at the estimated present value.

An advantage of this said further method of the present invention, which is basically a variant of the first-mentioned method and can be used in combination with that method, is that it is suitable for decreasing the amount of reducing agent that unintentionally leaves the SCR reactor in situations that involve a decreasing inlet amount of NOx. Thus, the slip of reducing agent, such as ammonia, is minimized. It will be appreciated that this said further method of the present invention could be combined with the first-mentioned method of controlling the dosage of reducing agent during increasing inlet amount of NOx, as described hereinbefore.

According to one embodiment of this said further method of the present invention, said further method additionally comprises the steps of comparing said estimated rate of increase to a lower limit value, and decreasing, when said estimated rate of increase is lower than the lower limit value, the dosage of said reducing agent to a lower value than what would be the case if said at least one predetermined parameter was kept constant at the estimated present value.

A further object of the present invention is to provide a device by means of which the supply of a reducing agent, such as ammonia or urea, to an SCR-reactor, can be controlled in a manner which is capable of handling quick variations in the amount of NOx in the process gases better than the prior art devices can.

This object is achieved through the use of a device according to the preamble and characterised in said device comprises a controller which is operative for purposes of estimating a rate of increase of said at least one predetermined parameter, and for increasing, when said estimated rate of increase is positive, the dosage of said reducing agent to a higher value than what would be the case if said at least one predetermined parameter was kept constant at the estimated present value.

An advantage of this device is that it provides a quick response to increasing inlet amounts of NOx, such that an increasing outlet amount of NOx, i.e., an increased emission of NOx to the atmosphere, can thereby be avoided in such situations.

According to one embodiment of the present invention, said device according to the preamble is operative for decreasing, when said estimated rate of increase is negative, the dosage of said reducing agent to a lower value than what would be the case if said at least one predetermined parameter was kept constant at the estimated present value. An advantage of this said device is that it provides a quick response to the presence of decreasing inlet amounts of NOx, such that an increasing outlet amount of reducing agent, i.e., a slip of a reducing agent, such as ammonia, to the atmosphere can thereby be avoided in such situations.

A further object of the present invention is to provide a method of controlling the supply of a reducing agent, such as ammonia or urea, to an SCR-reactor, which method is capable of handling quick variations in the amount of NOx in the process gases.

This latter object is capable of being achieved by means of a method according to the preamble and comprising the step of controlling the feeding of the reducing agent including utilizing a relation between the load of the process plant and the mass flow of NOx to the selective catalytic reduction reactor for estimating the relevant value of said at least one predetermined parameter, such that an estimated load of the process plant can be converted to an expected mass flow of NOx to the selective catalytic reduction reactor, such that on the basis of the mass flow of NOx the dosage of said reducing agent may be adjusted.

An advantage of this said method of the present invention is that it provides for an early warning of changes in the inlet amount of NOx that will later arrive at the SCR reactor. Thus, the control system may react to forthcoming changes in the inlet amount of NOx and thereby prepare the SCR reactor for those changes in the inlet amount of NOx that will be forthcoming. There is always some time delays associated with the functioning of the valves, pipes, etc, that are present in the ammonia supply system. Accordingly, by providing such an early warning it is thereby possible to compensate for such time delays, such that a supply of a prescribed amount of reducing agent can be accurately matched in time with the corresponding inlet amount of NOx.

According to another embodiment of the present invention, said relation between the load of the process plant and the mass flow of NOx to the selective catalytic reduction reactor includes a mathematical model which is an approximation of the relation between the load of the process plant and the mass flow of NOx to the selective catalytic reduction reactor. An advantage of said another embodiment of the present invention is that measuring the load of the process plant, or obtaining a signal indicating the load of the process plant, makes it possible to obtain an accurate indication of the inlet amount of NOx, such that the control system may accordingly accurately control the supply of the reducing agent to the SCR reactor.

According to yet another embodiment of the present invention, the load of the process plant is utilized in a feed-forward mode in order to thereby control the dosage of said reducing agent to the selective catalytic reduction reactor. An advantage of said yet another embodiment of the present invention is that changes in the inlet amount of NOx are detected at a very early stage, which makes it possible for the control system not only to account for the time delays in the dosing system, but also to account for the slow response of the SCR catalyst thereto, such as, for example, by utilizing the first-mentioned method of controlling the supply of reducing agent when there is an increasing inlet amount of NOx.

Further objects and features of the present invention will be apparent from the description and the claims.

BRIEF DESCRIPTION OF THE DRAWINGS

The invention will now be described in more detail with reference to the appended drawings in which.

DESCRIPTION OF PREFERRED EMBODIMENTS

Figure 1:
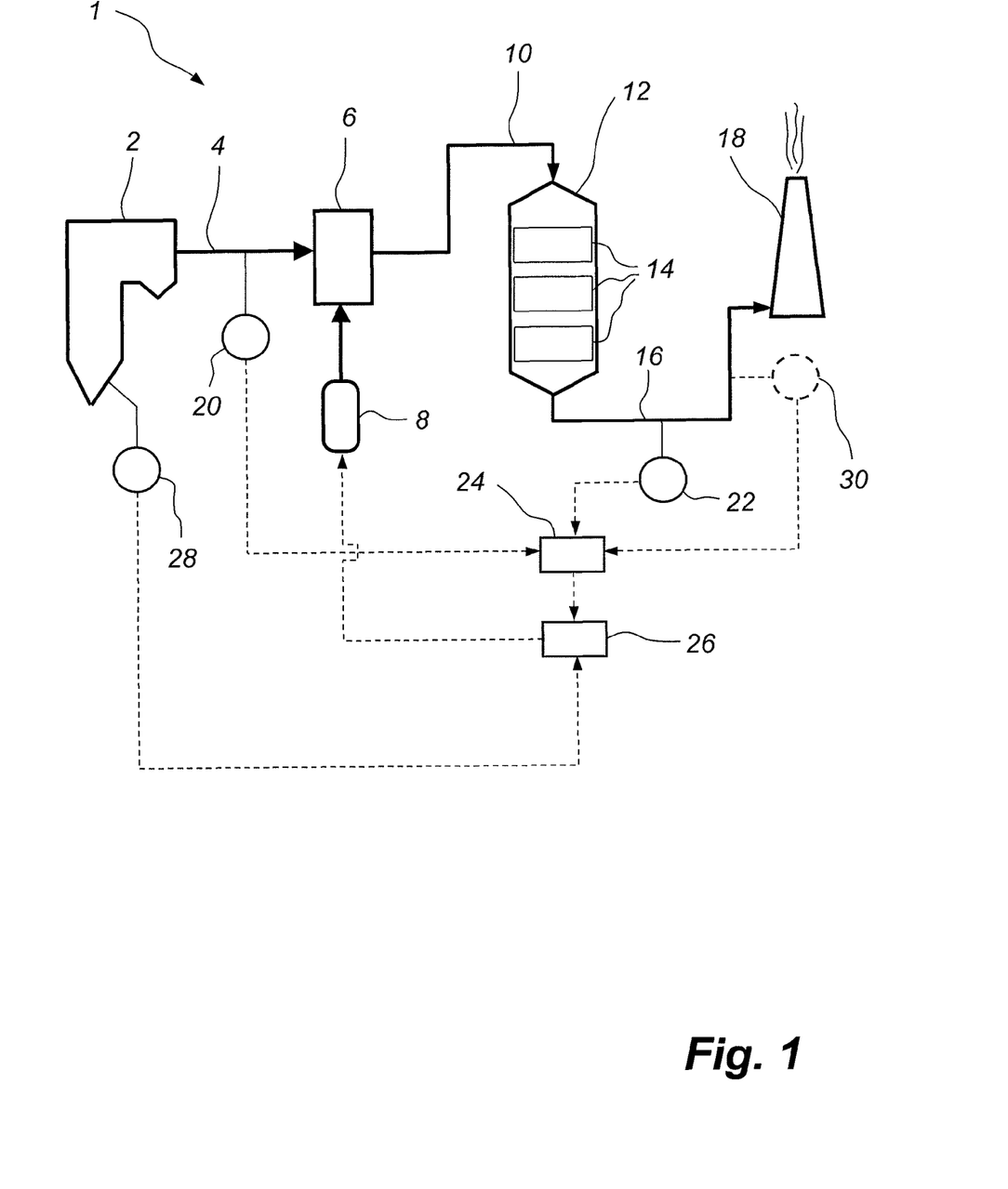
FIG. 1 is a schematic side view of a coal fired power plant.

FIG. 1 is a schematic side view illustration of a power plant 1. The power plant 1 comprises a coal fired boiler 2. In the coal fired boiler 2 coal is combusted in the presence of air generating flue gases that leave the coal fired boiler 2 via a duct 4. The duct 4 forwards the flue gases to an ammonia-injection system 6. In the ammonia injection system 6 gaseous ammonia, $NH_3$, is added to the flue gases and is thoroughly mixed with the flue gases. The gaseous ammonia is supplied to the ammonia injection system 6 from an ammonia supply system 8. The flue gases leave the ammonia injection system 6 via a duct 10 and are forwarded to a selective catalytic reduction (SCR) reactor 12. The SCR reactor 12 comprises one or more consecutive layers 14 of SCR-catalyst. This SCR catalyst comprises a catalytically active component, such as vanadium pentoxide or wolfram trioxide, applied to a ceramic carrier material so as to comprise, e.g., a honeycomb structure or a plate structure. In the SCR reactor 12 the nitrogen oxides, NOx, in the flue gases react with the ammonia injected into the flue gases by means of the ammonia injection system 6 to form nitrogen gas, $N_2$. The flue gases then leave the SCR-reactor 12 via a duct 16 and are emitted into the atmosphere via a stack 18. It will be appreciated that the power plant 1 may comprise further gas cleaning devices, such as particulate removers, such as electrostatic precipitators, and such as wet scrubbers. For reasons of maintaining clarity of illustration in the drawings such devices are not shown in FIG. 1.

A first NOx analyzer 20 is operative for measuring the amount of NOx in the duct 4, i.e., just after the boiler 2 and upstream of the SCR reactor 12. A second NOx analyzer 22 is operative for measuring the amount of NOx in the duct 16, i.e., downstream of the SCR reactor 12. A first controller 24 receives input from the first NOx analyzer 20 and the second NOx analyzer 22, as indicated in FIG. 1. Based on that input the first controller 24 calculates a present NOx removal efficiency. The calculated present NOx removal efficiency is compared to a NOx removal set point. This may be done by means of a PID-controller included in the first controller 24. The first controller 24 calculates, e.g. by means of said PID controller, a set point for the flow of ammonia, and sends information about such flow of ammonia to a second controller 26.

A load sensor 28 is operative for sensing the load on the boiler 2. Such load could be expressed in terms of, for example, the amount of fuel, such as ton/h of coal, that is transported to the boiler 2. The load sensor 28 causes a signal to be sent to the second controller 26. This signal from the load sensor 28 indicates the load on the boiler 2, and is, since the boiler 2 is located upstream of the SCR reactor 12, a feed-forward signal indicating the load on the boiler 2 that will affect the SCR reactor 12 in the near future. It will be appreciated that the load sensor 28 may give more or less of an early warning of the amount of NOx to which the SCR reactor 12 will be exposed. If, for instance, the load sensor 28 measures the present supply of fuel to the boiler 2, then the load on the boiler 2 that is indicated to the second controller 26 is the load to which the SCR reactor 12 will be exposed within a few minutes. If, on the other hand, the load sensor 28 senses, e.g., the set point of the fuel supply to the boiler 2, then the load signal forwarded from the load sensor 28 to the second controller 26 corresponds to the amount of NOx to which the SCR reactor 12 will be exposed within several minutes or even hours.

The second controller 26 accounts for the load on the boiler 2, as measured by the load sensor 28, and adjusts, based on the load on the boiler 2, the set point for the flow of ammonia as calculated by the first controller 24. An adjusted set point for the flow of ammonia, which takes the load on the boiler 2 into account, is sent to the ammonia supply system 8, which then supplies ammonia to the ammonia injection system 6.

As an option, an ammonia slip analyzer 30 could be provided. The ammonia slip analyzer 30, as illustrated in FIG. 1, is designed to be operative for measuring the concentration of ammonia in the gas duct 16, i.e., downstream of the SCR reactor 12. The ammonia slip analyzer 30 causes a signal to be sent to the first controller 24. In response to its receiving such a signal, the first controller 24 may adjust the set point for the flow of ammonia for the purpose of avoiding too large an ammonia slip from the SCR reactor 12. The strategy for the first controller 24 can be selected to be one wherein the removal efficiency of NOx is maximized up to a certain maximum slip of ammonia, as the latter being measured by the ammonia slip analyzer 30. When the measured ammonia slip reaches a maximum ammonia slip value, as determined by the ammonia slip analyzer 30, the first controller 24 controls the set point for the flow of ammonia in such a manner that this maximum ammonia slip value is not exceeded. Other control strategies are also possible, for example the strategy of maintaining a certain outlet NOx amount, up to a certain slip of ammonia, the latter being measured by the ammonia slip analyzer 30.

Figure 2:
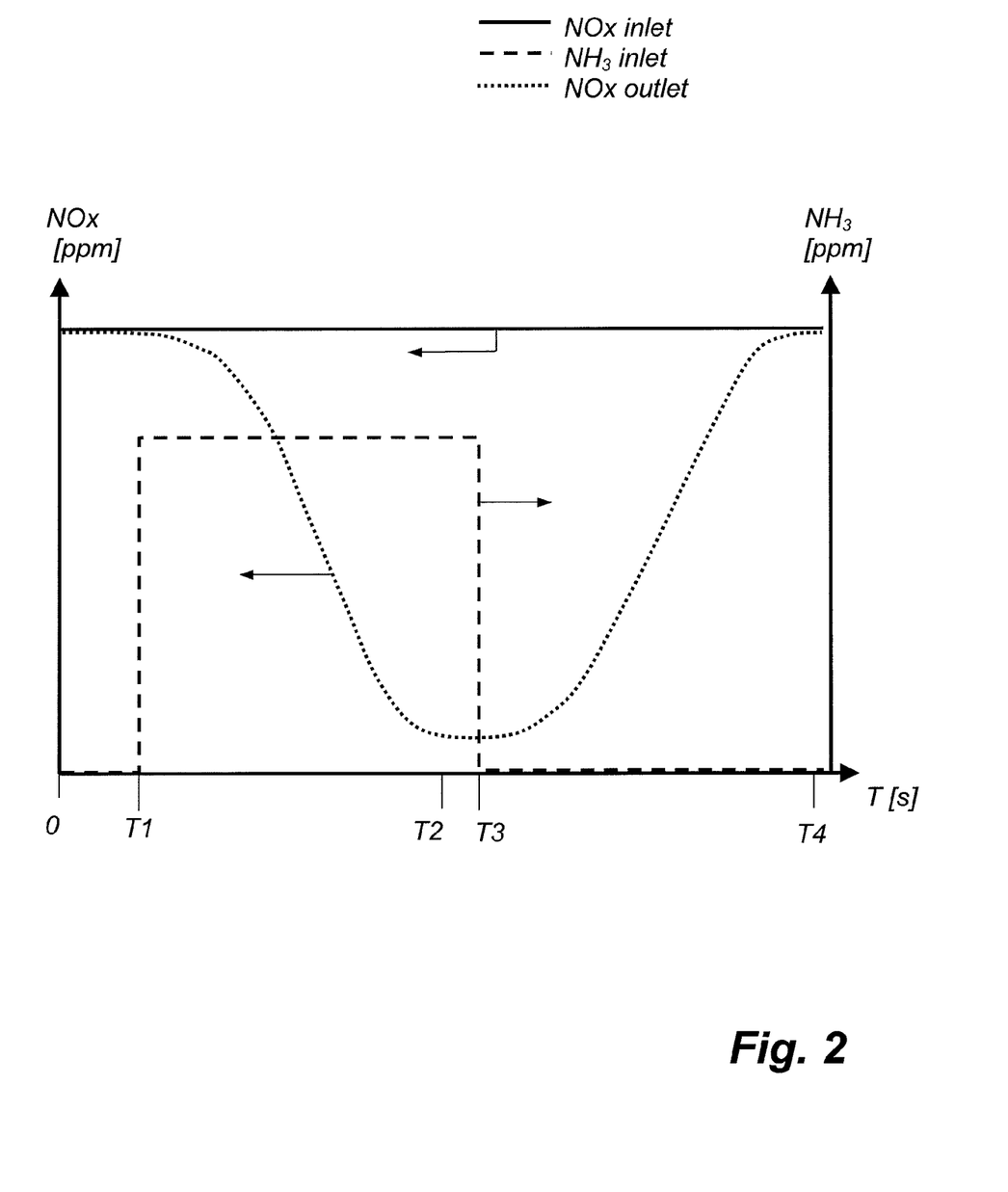
FIG. 2 is a schematic diagram illustrating the behaviour of a typical SCR catalyst.

FIG. 2 illustrates, in a schematic manner, the manner in which a typical SCR catalyst has been found to behave. A typical SCR catalyst may comprise vanadium pentoxide, $V_2O_5$, and/or wolfram trioxide, $WO_3$, as active ingredients added to a ceramic base material, such as, for instance, a honeycomb ceramic carrier.

At T=0 there is no supply of reducing agent, the latter reducing agent preferably being in the form of ammonia, $NH_3$, to the SCR catalyst. Thus, the concentration of NOx to the inlet of the SCR catalyst, depicted by the curve denoted "NOx inlet" in FIG. 2, is substantially equal to the concentration of NOx from the outlet of the SCR catalyst, depicted by the curve denoted "NOx outlet" in FIG. 2 at T=0. At T1 the supply of ammonia is initiated. FIG. 2 illustrates how such a supply of ammonia is initiated in the form of a step, the latter ammonia supply being depicted by the curve denoted "$NH_3$ inlet" in FIG. 2. As can be seen from FIG. 2, the outlet NOx, depicted by the curve denoted "NOx outlet", starts to decrease slowly after T1. The reason for this slow decrease is believed to be due to the fact that the SCR catalyst comprises a number of active sites. Thus, at the initiation of the supplying of ammonia to the SCR catalyst, all of these active sites are empty. Thus, during the process wherein a sufficient number of these active sites become filled with ammonia, the capacity of the SCR catalyst to decrease the concentration of NOx is gradually increased. Thereafter, at time T2 when a sufficient number of the active sites of the SCR catalyst have become filled with ammonia, the reduction of NOx can then proceed with the intended efficiency.

Continuing, at time T3 the supply of ammonia to the SCR catalyst in the form of a step ceases. As will be best understood with reference to FIG. 2, the outlet concentration of NOx, depicted by the curve denoted "NOx outlet" in FIG. 2, starts to increase after the time T3, but this increase is very slow, in particular just after the time T3. The reason for this comparatively slow increase appears to be that many active sites of the SCR catalyst are, at the time T3, filled with ammonia. Hence, even after the supplying of ammonia ceases at T3, the SCR catalyst for quite some time retains its capacity to reduce NOx. As will be readily understood with reference to FIG. 2, not until the time T4 does the concentration of NOx after the SCR catalyst, as depicted therein by the curve denoted "NOx outlet", reach the same level as the inlet concentration of NOx, the latter being depicted therein by the curve denoted "NOx inlet". The time from T1 to T2, and from T3 to T4, typically could be in the range of 30 minutes, although this time could vary considerably depending on such factors as, for example, the type of catalyst, the flue gas temperature, the amount of NOx, etc.

Hence, from a reference to FIG. 2 it will be readily apparent that the SCR catalyst appears to require quite some time after the supplying of ammonia thereto is initiated before the SCR catalyst's capability for reducing NOx has been built up sufficiently. Furthermore, it would appear as if the SCR catalyst retains its capacity for reducing NOx for quite some time after the supplying of ammonia ceases. Hence, the SCR catalyst has the capability of storing the reducing agent, i.e., ammonia, on the active sites thereof. Based on this observation, in accordance with the present invention an efficient manner of controlling the supply of ammonia to an SCR catalyst has been developed. This control method, which will be described in detail below, is capable of being implemented, e.g., in the second controller 26 for the purpose of controlling the amount of reducing agent, such as ammonia, that is supplied from the ammonia supply system 8 to the ammonia injection system 6, at a location upstream of the SCR reactor 12, which is to be found illustrated in FIG. 1 of the drawings.

This control method in accordance with the present invention includes the step of estimating the rate of increase of a parameter that is indicative of the amount of NOx at the inlet to the SCR catalyst. This estimation could be based on the measurement at regular time intervals of the NOx concentration at the inlet of the SCR catalyst in, e.g., the unit ppm. In this way it is possible to estimate at what rate the NOx concentration is increasing at the inlet of the SCR catalyst. If, for instance, the NOx concentration on one occasion at a location upstream of the inlet of the SCR catalyst is measured to be 230 ppm, and three (3) minutes later the NOx concentration at the same location upstream of the inlet of the SCR catalyst is measured to be 260 ppm, then the rate of increase in the NOx concentration measured at this location upstream of the inlet of the SCR catalyst can be estimated to be (260−230)/3=10 ppm/minute. Such a calculation indicates the rate of increase in the concentration of NOx measured at this location upstream of the inlet of the SCR catalyst.

To further improve the accuracy of the estimation of the NOx concentration at the inlet of the SCR catalyst, it is preferable to utilize the boiler load signal, obtained from the load sensor 28, to calculate the rate of increase of the amount of NOx, rather than just the rate of increase in the NOx concentration. Based on the boiler load signal that is provided from the load sensor 28 and the measured concentration of NOx from the first NOx analyzer 20, it then becomes possible to calculate the change in the amount of NOx that is present at the inlet of the SCR catalyst. For instance, if the amount of NOx at the inlet of the SCR catalyst on one occasion is measured to be 30 kg/hour, and then, 3 minutes later, is measured to be 36 kg/hour, then the rate of increase of the NOx at the inlet of the SCR catalyst can be estimated to be (36−30)/3=2 kg/hour per minute.

Basically the examples given above of the rate of increase of the NOx at the inlet of the SCR catalyst corresponds to the derivative of the NOx concentration at the inlet of the SCR catalyst at the stated time intervals. It will be appreciated that without departing from the essence of the present invention the second controller 26 could equally well be made to be operative for purposes of continuously calculating derivative values that are based on the input from the first NOx analyzer 20 and/or the load sensor 28.

This estimated rate of increase of the NOx at the inlet of the SCR catalyst is compared to an upper limit value. Such an upper limit value could be, e.g., 20 ppm/minute or 4 kg/hour per minute. If the estimated rate of increase of the NOx at the inlet of the SCR catalyst remains below the upper limit value, then the second controller 28 is operative to attempt to match the increase in the NOx concentration at the inlet of the SCR catalyst by causing there to be provided a similar increase in the ammonia supply. Effecting such a match is per se known. If, however, the rate of increase in the amount of NOx at the inlet of the SCR catalyst exceeds the established upper limit value, if that is, for example, the rate of increase of the amount of NOx at the inlet of the SCR catalyst reaches 5 kg/hour per minute, then the amount of said reducing agent, e.g., ammonia, will be increased to a higher value than would be the case if said at least one predetermined parameter was kept constant at the estimated present value thereof. Namely, for example, if the rate of increase of the amount of NOx at the inlet of the SCR catalyst were to be estimated to be 5 kg/hour per minute, which would exceed the established upper limit value of 4 kg/hour per minute, and the present value of the amount of NOx at the inlet of the SCR catalyst is 36 kg/hour, then the setpoint for the amount of ammonia to be supplied could be set, by the second controller 26, to be an amount of ammonia which corresponds to, e.g., 50 kg/hour of NOx. Thus, when the rate of increase in the amount of NOx at the inlet of the SCR catalyst exceeds the established upper limit value therefor, then the second controller 28 is operative to cause a supply of ammonia to be provided, which is much larger than the amount of ammonia, which would otherwise be supplied for the present amount of NOx, if said present amount of NOx were to remain constant for a longer period of time. In other words, an amount of 36 kg/h of NOx at the inlet of the SCR catalyst, at completely constant conditions, would require that X kg/h of ammonia be supplied. However, when the estimated rate of increase of the amount of NOx at the inlet of the SCR catalyst becomes greater than the established upper limit value therefor, then the amount of ammonia being supplied is increased to a higher value, such as, e.g., X+10 kg/h, in order to thereby achieve an "overshoot" in the amount of ammonia supplied in relation to the value thereof, i.e., 36 kg/h of NOx, that is actually measured. This much greater supply of ammonia is later compensated for by decreasing the amount of ammonia being supplied to below the amount thereof, which corresponds to the amount of ammonia required to be supplied based on the present amount of NOx at the inlet of the SCR catalyst. In accordance with this method of the present invention an increase in the amount of NOx at the inlet of the SCR catalyst is thus addressed by first increasing the amount of ammonia being supplied to more than what is needed based on the present amount of NOx at the inlet of the SCR catalyst, in the event that said amount of NOx at the inlet of the SCR catalyst would have remained constant, and to then compensate by decreasing the amount of ammonia being supplied by more than the amount that would be needed based on the present amount of NOx at the inlet of the SCR catalyst.

Thus, the method in accordance with the present invention combines the supplying of an early "overshoot" amount of ammonia with a later supplying of a "correction" amount of ammonia. Such a combination of steps in accordance with the method of the present invention has been found to be very efficient in controlling situations when the amount of NOx at the inlet of the SCR catalyst increases rapidly. The reason for this is believed to be the fact that the SCR catalyst is, as best understood with reference to FIG. 2, quite slow in reacting to changes in the amount of ammonia being supplied. By supplying an "overshoot" amount of ammonia a large amount of ammonia is rapidly supplied to the SCR catalyst to quickly fill the available active sites thereof. Thus, the SCR catalyst is quickly brought into a condition in which it can reduce most of the increasing amount of NOx that is being provided at the inlet of the SCR catalyst. By the supplying of a "correction" amount of ammonia there is thereby avoided the possibility that the SCR catalyst might become overfilled with ammonia, which would in turn result in there being an unwanted amount of slip of ammonia. Hence, the method in accordance with the present invention is capable of counteracting the problems of slow response that as such serves to characterize the operation the SCR catalyst.

Hereinbefore it has been described that in accordance with the method of the present invention the combination of the step of supplying an "overshoot" amount of ammonia and the step of supplying a "correction" amount of ammonia is triggered by the fact that the rate of increase of the amount of NOx at the inlet of the SCR catalyst exceeds a certain established upper limit value therefor. The setting of such an established upper limit value is individual for each plant and can be determined based on several plant factors that are specific to the individual power plant 1. Examples of such factors include, by way of exemplification and not limitation, the manner in which the amount of NOx at the inlet of the SCR catalyst varies, the requirements as regards the NOx concentration at the outlet of the SCR catalyst, the requirement as regards the amount of ammonia that leaves the outlet of the SCR catalyst, i.e., what is commonly referred to as ammonia slip, the amount and type of SCR catalyst, etc.

It will be appreciated that without departing from the essence of the present invention, it is not necessary to utilize an upper limit value at all, such that any increase in the amount of NOx at the inlet of the SCR catalyst will initiate the supplying of an "overshoot" amount of ammonia, followed by the supplying of a "correction" amount of ammonia.

Hereinbefore it has been described in accordance with the method of the present invention how an increase in the amount of NOx at the inlet of the SCR catalyst is addressed. To this end, it will be appreciated that in accordance with the method of the present invention, a decrease in the amount of NOx at the inlet of the SCR catalyst could without departing from the essence of the present invention be addressed in a similar manner. Namely, for instance, a lower limit value on the rate of increase of the amount of NOx at the inlet of the SCR catalyst could be established, e.g., −4 kg/hour per minute. Then when the amount of NOx at the inlet of the SCR catalyst decreases at a rate of increase which is less than −4 kg/hour per minute, the supply of ammonia is caused to decrease to a lower value than would be the case if said at least one predetermined parameter was kept constant at the estimated present value thereof. Such a behaviour could be deemed to be the supplying of an "undershoot" amount of ammonia. Such a supplying of an "undershoot" amount of ammonia is then in accordance with the method of the present invention followed by the supplying of a "correction" amount of ammonia.

Figure 3:
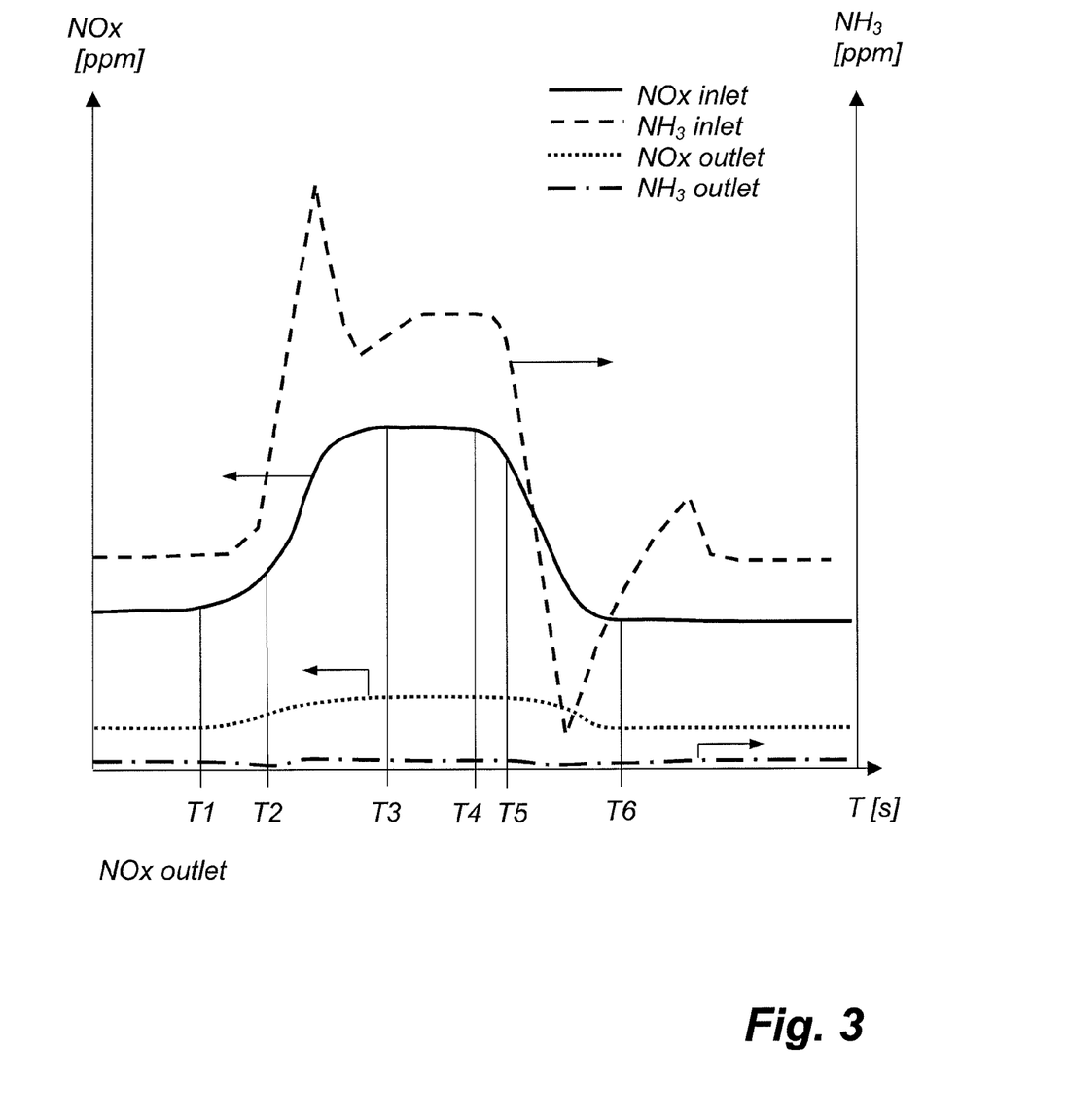
FIG. 3 is a schematic diagram illustrating the result of operating an SCR reactor by controlling the supply of ammonia in accordance with a method of an embodiment of the present invention.

FIG. 3 illustrates in a schematic manner the effect of the method of the present invention, as described hereinbefore, when applied to the power plant 1 of FIG. 1. As will be best understood from a reference to FIG. 3 there are four curves depicted therein: a curve denoted "NOx inlet", which is representative of the concentration of NOx at the inlet of the SCR reactor 12, a curve denoted "NOx outlet", which is representative of the concentration of NOx after the SCR reactor 12, a curve denoted "$NH_3$ inlet", which is representative of the concentration of ammonia that is supplied to the ammonia injection system 6, i.e., the ammonia that is supplied upstream of the SCR reactor 12, and a curve denoted "$NH_3$ outlet", which is representative of the concentration of ammonia leaving the SCR reactor 12, i.e., the amount of ammonia slip. The boiler load is assumed to be constant during the time frame illustrated in FIG. 3, which means that the "NOx inlet" curve is representative of the amount of NOx at the inlet of the SCR catalyst.

Continuing with reference to FIG. 3 of the drawings, as seen with reference thereto at the time T1 the concentration of NOx at the inlet of the SCR catalyst starts to increase. This increased amount of NOx at the inlet of the SCR catalyst is sensed by the first NOx analyser 20, such that this increased amount of NOx at the inlet of the SCR catalyst effects a triggering of the first and second controllers 24, 26 whereby the supply of ammonia is increased to the ammonia injection system 6. With further reference to FIG. 3, as seen with reference thereto at the time T2 the rate of increase in the amount of NOx at the inlet of the SCR catalyst, as estimated by the second controller 26, is determined to be higher than an established upper limit value therefor. Due to a determination of this fact, the second controller 26 causes a large increase to be effected in the amount of ammonia that is supplied from the ammonia supply system 8 to the ammonia injection system 6. This increase is depicted in FIG. 3, as a steep increase in the "$NH_3$ inlet" curve just after T2. It will be readily appreciated that the amount of ammonia at the inlet of the SCR catalyst, which is depicted by the "$NH_3$ inlet" curve, just after T2 is much greater than what would be needed at the "NOx inlet" at that particular point in time. After the steep increase in the "NH₃ inlet" curve, which effectively comprises the supplying of an "overshoot" amount of ammonia, a correction is made, which is depicted in FIG. 3. Continuing, after the time T3 the concentration of NOx at the inlet of the SCR catalyst is stabilized at the new level, and the amount of ammonia at the inlet of the SCR catalyst likewise becomes stabilized at a level that corresponds to the new level of NOx at the inlet of the SCR catalyst.

With further reference to FIG. 3, as can be seen therefrom at the time T4 the concentration of NOx at the inlet of the SCR catalyst starts to decrease. This decreased amount of NOx at the inlet of the SCR catalyst is sensed by the first NOx analyser 20, which in turn triggers the first and second controllers 24, 26 causing the latter to be operable to decrease the supply of ammonia to the ammonia injection system 6. Continuing, as can be seen from FIG. 3 at the time T5, the rate of increase in the amount of NOx at the inlet of the SCR catalyst, as estimated by the second controller 26, will be deemed to be lower than an established lower limit value. Based on this fact, the second controller 26 is operative to initiate a large decrease in the amount of ammonia that is supplied from the ammonia supply system 8 to the ammonia injection system 6. Such a decrease in the amount of ammonia that is being supplied is depicted, in FIG. 3, as a steep decrease in the curve denoted "NH₃ inlet" curve just after the point labelled T5 in FIG. 3. After this steep decrease, which is representative of the supplying of an "undershoot" amount of ammonia, a correction is made, as best understood with reference to FIG. 3. As can be seen with reference to FIG. 3, after the time T6 the concentration of NOx at the inlet of the SCR catalyst becomes stabilized at the new level, and the amount of ammonia at the inlet of the SCR catalyst becomes stabilized at a level corresponding to this new level of NOx at the inlet of the SCR catalyst.

As will be best understood from a reference to FIG. 3, the concentration of NOx at the outlet of the SCR catalyst, denoted therein by the curve "NOx outlet", depicts a minor increase in the concentration of NOx at the outlet of the SCR catalyst during the time period starting at T2 and ending at T6, which in turn corresponds to the increased amount of NOx at the inlet of the SCR catalyst during that same time period. The concentration of ammonia at the outlet of the SCR catalyst, which is denoted in FIG. 3 as the curve "NH₃ outlet", remains very low during that entire same time period. Thus, the method in accordance with the present invention as described hereinbefore, comprising the step of utilizing the supplying of an "overshoot" amount of ammonia combined with effecting a correction with respect thereto when the amount of NOx at the inlet of the SCR catalyst increases and the step of utilizing the supplying of an "undershoot" amount of ammonia combined with effecting a correction with respect thereto when the amount of NOx at the inlet of the SCR catalyst decreases, enables low NOx concentrations to be had at the outlet of the SCR catalyst and low NH₃ concentrations to be had at the outlet of the SCR catalyst also in situations wherein the amount of NOx varies at the inlet of the SCR catalyst.

Figure 4:
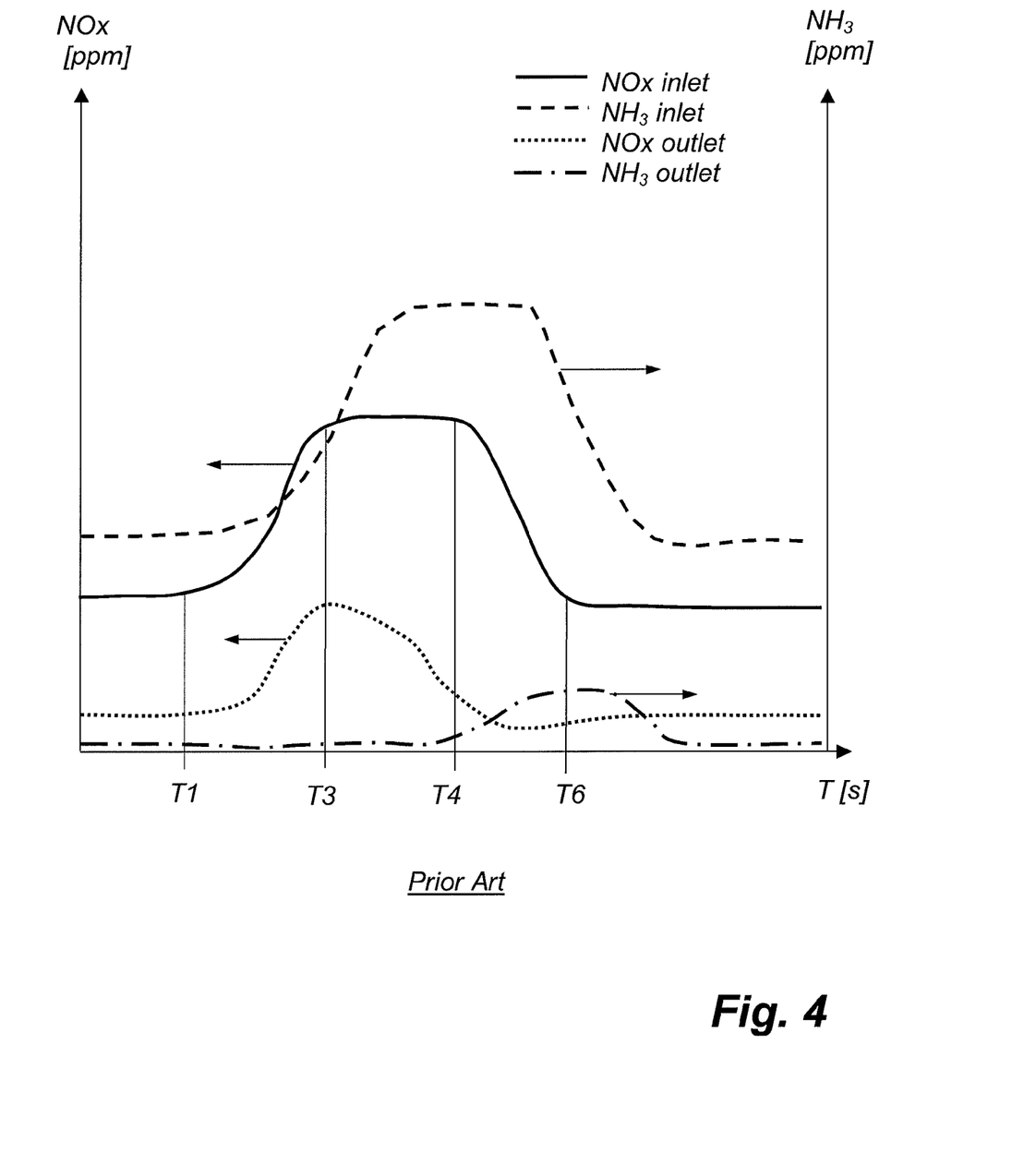
FIG. 4 is a schematic diagram illustrating the result of operating an SCR reactor in accordance with a prior art method.

In FIG. 4 there is illustrated schematically the mode of operation of a method in accordance with the prior art. As best understood with reference to FIG. 4, the amount of NOx at the inlet of the SCR catalyst is similar to that illustrated in FIG. 3, and, hence, the curve denoted "NOx inlet" in FIG. 4 is identical to the curve denoted "NOx inlet" in FIG. 3. With further reference to FIG. 4, it can readily be seen with reference thereto that at T1 the amount of NOx at the inlet of the SCR catalyst starts to increase. This prior art method employs a rather conservative approach, and for that reason the amount of ammonia at the inlet of the SCR catalyst, denoted in FIG. 4 by the curve "NH₃ inlet", does not depict an increase until quite some time after the increase in the amount of NOx at the inlet of the SCR catalyst has been detected. As can be seen in FIG. 4, at T3 the amount of NOx at the inlet of the SCR catalyst achieves a stable level. However, the curve denoted "NH₃ inlet" in FIG. 4 continues to depict an increase after the point labelled T3 therein. This is attributable to the slow response of the control system that is employed in the prior art method that is depicted in FIG. 4. Continuing, as seen from a reference to FIG. 4, it is at T4 that the amount of NOx at the inlet of the SCR catalyst starts to decrease. Again, the prior art control method that is depicted in FIG. 4 results in a rather slow response, which means that the curve denoted therein as "NH₃ inlet" continues to remain high for a rather long time, before a decrease thereof is initiated. As depicted in FIG. 4, at T6, when the amount of NOx at the inlet of the SCR catalyst has reached a stable level, the curve denoted therein as "NH₃ inlet" is still decreasing. The effects that result from the slow response of the prior art method, which is illustrated in FIG. 4, can easily be seen from a comparison of FIG. 4 with FIG. 3. For instance, it is readily apparent from a reference to FIG. 4 that the amount of NOx at the outlet of the SCR catalyst, which is denoted by the curve "NOx outlet" in FIG. 4, increases rather rapidly after T1 and peaks at T3. Thus, the slow response to the increased NOx concentration at T1 of the prior art method results in an increase in the NOx emission. Furthermore, it is also readily understood from a reference to FIG. 4 that the amount of NH₃ at the outlet of the SCR catalyst, which is denoted by the curve "NH₃ outlet" in FIG. 4, increases rather rapidly after T4 and peaks at T6. Thus, the slow response to the decreased NOx concentration at T4 in accordance with the prior art method that is depicted in FIG. 4 results in an increase in the amount of slip of the ammonia. The present method, on the other hand, which is depicted in FIG. 3, shows no such peaks of NOx at the outlet of the SCR catalyst or NH3 at the outlet of the SCR catalyst.

As such, it can thus be seen that the method in accordance with the present invention provides a method for controlling the supplying of a reducing agent, such as ammonia, to an SCR reactor in such a way that peaks of NOx at the outlet of the SCR catalyst and/or NH₃ at the outlet of the SCR catalyst can be avoided when the amount of NOx varies at the inlet of the SCR catalyst.

Figure 5:
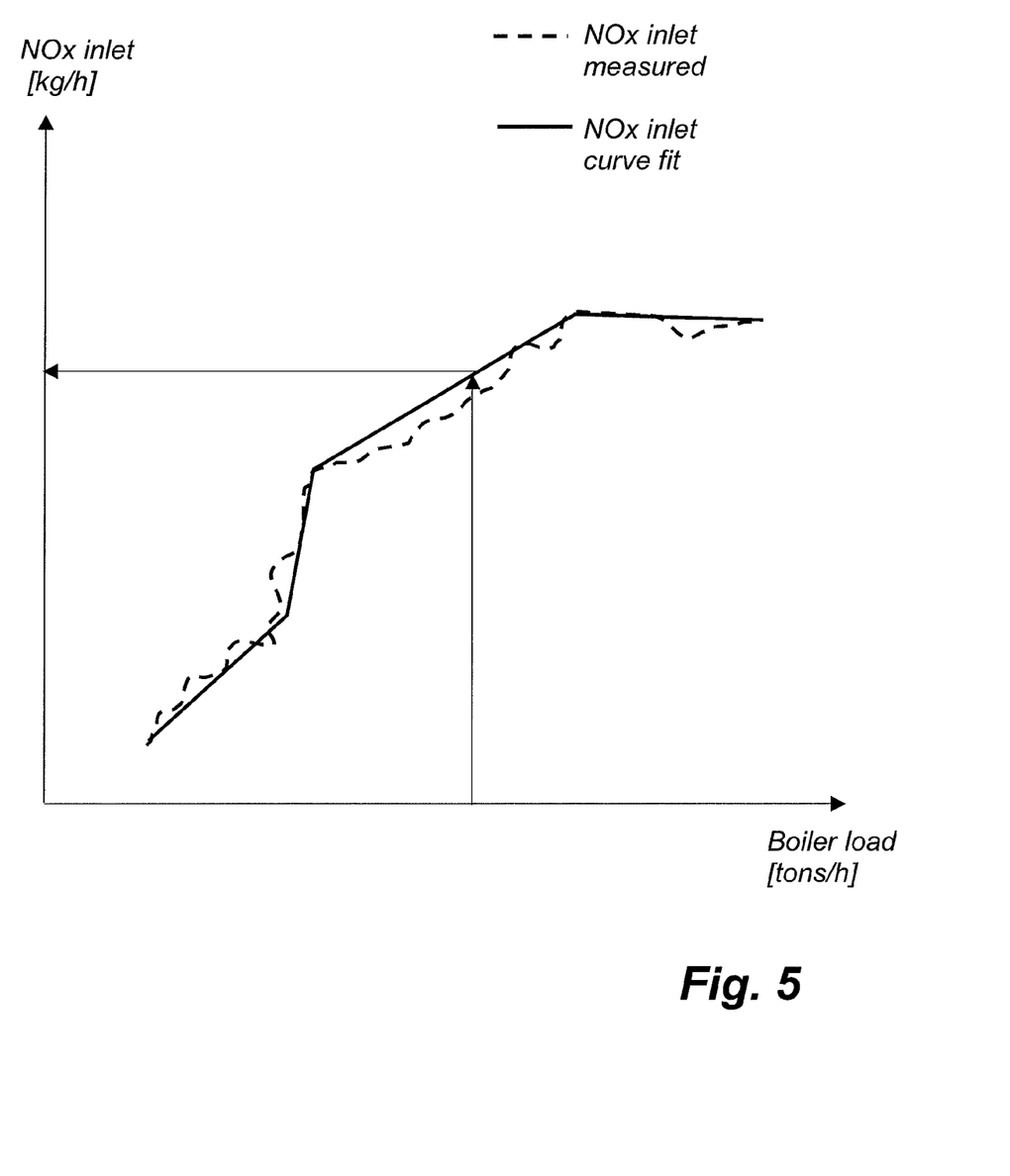
FIG. 5 is a schematic diagram illustrating the relation between the load of a power plant and the corresponding amount of generated NOx.

FIG. 5 is a schematic diagram which illustrates a manner in which the control of the supply of ammonia can be further improved in accordance with the present invention. To this end, the diagram of FIG. 5 illustrates, on the x-axis, the load on the boiler 2 of FIG. 1, in the unit tons/h of fuel. The y-axis of the schematic diagram in FIG. 5 illustrates the corresponding amount of NOx at the inlet of the SCR catalyst, in the unit kg/h. The dotted line in FIG. 5 is illustrative of schematic measurements, in which the load on the boiler 2 has been measured by means of the load sensor 28, illustrated in FIG. 1, and the amount of NOx at the inlet of the SCR catalyst has been calculated from corresponding measurements of the NOx concentration at the inlet of the SCR catalyst, measured by the first NOx analyser 20, and flue gas flow measurements. The solid line in FIG. 5 is illustrative of a piece-wise linear curve representative of the measurements. Such a piece-wise linear curve is utilized as a mathematical model such that the supply of ammonia can be controlled thereby, in a feed-forward manner.

For example, the mathematical model can be implemented in the second controller 26 of FIG. 1, such that the second controller 26 receives information regarding the current load on the boiler 2 from the load sensor 28. It will be readily understood that because the SCR reactor 12 is located downstream of the boiler 2 the current load on the boiler 2 is an indication of the future load that will be see by the SCR reactor 12. Thus, the second controller 26 may then utilize the mathematical model, i.e., the piece-wise linear curve that is illustrated in FIG. 5, to calculate the amount of NOx at the inlet of the SCR catalyst, in kg/h, that can be expected in the next few minutes. As such, the second controller 26 may then be utilized, in a feed-forward manner and based on the mathematical model depicted in FIG. 5, for purposes of controlling the supply of ammonia from the ammonia supply system 8 to the ammonia injection system 6. It will be readily understood that the amount of NOx at the inlet of the SCR catalyst that is calculated by the second controller 26 based on the mathematical model, which is depicted in FIG. 5, would normally correspond to the amount of NOx that will reach the inlet of the SCR reactor 12 within typically 5 to 300 seconds. It would also be possible, however, without departing from the essence of the present invention to transmit the boiler load set point signal from a central boiler control system to the second controller 26 in order to provide more of an early warning of load changes. In such a latter case, the second controller 26 could be made receive information regarding the load on the boiler 2 that is to be expected within the next 30 minutes or so.

It will be appreciated that numerous variants of the above-described embodiments of the present invention are possible within the scope of the appended claims.

For instance it has been described above that in accordance with the preferred embodiment of the present invention the reducing agent is ammonia, $NH_3$. However, it is per se known in accordance with the prior art to employ different ways of administering a reducing agent to the flue gas in selective catalytic reduction (SCR) applications. For example, the reducing agent can be administered as a pressurized $NH_3$ gas, as an aqueous $NH_3$ solution, as an aqueous solution of urea, as pure urea in a solid or molten liquid form, as $NH_3$ generated from a urea source, or from another solid ammonia source, such as ammonia carbamate. Hence, the reducing agents used in the prior art for SCR directed to the removal of NOx could also be utilized without departing from the essence of the present invention.

Hereinbefore, it has been described that the control method in accordance with the present invention involves the step of supplying an "overshooting" amount of ammonia when the rate of increase of the NOx at the inlet of the SCR catalyst is positive, i.e., when the amount of NOx at the inlet of the SCR catalyst increases, and the step of supplying an "undershooting" amount of ammonia when the rate of increase of the NOx at the inlet of the SCR catalyst is negative, i.e., when the amount of NOx at the inlet of the SCR catalyst decreases. It will be readily appreciated that without departing from the essence of the present invention a method could be utilized in which only one of these steps is employed. For example, a first alternative to the method of the present invention could comprise the step of supplying an "overshooting" amount of ammonia when the rate of increase of NOx at the inlet of the SCR catalyst is positive, but not the step of supplying an "undershooting" amount of ammonia when the rate of increase of NOx at the inlet of the SCR catalyst is negative. Such an alternative to the method of the present invention could be utilized in instances when there is a great deal of focus on NOx removal, but little focus on ammonia slip. A second alternative to the method of the present invention could comprise the step of supplying an "undershooting" amount of ammonia when the rate of increase of NOx at the inlet of the SCR catalyst is negative, but not the step of supplying an "overshooting" amount of ammonia when the rate of increase of NOx at the inlet of the SCR catalyst is positive. Such a second alternative to the method of the present invention could be utilized when there is a great deal of focus on keeping the amount of slip of the reducing agent, such as ammonia, at a low level, but little focus on the efficiency insofar as NOx removal is concerned.

It has been described hereinbefore that the invention can be applied to a process plant in the form of a coal fired boiler. It will be appreciated that the invention may be applied to other types of process plants as well, including thermal power plants fired with oil, oil shale, gas, waste material, etc.

While several embodiments and variations of the present invention have been shown and described herein, it will be appreciated that modifications thereof, some of which have been alluded to hereinabove, may still be readily made thereto by those skilled in the art. It is, therefore, intended that the appended claims shall encompass the modifications alluded to herein as well as all the other modifications that fall within the true spirit and scope of the present invention.

What is claimed is:

1. A method of controlling feeding of a reducing agent, such as urea or ammonia, to a selective catalytic reduction reactor which is operative for removing NOx from a process gas of a process plant, such as a combustion plant or an incineration plant, said method of controlling the feeding of the reducing agent comprising the steps of:
    estimating an estimated present value of at least one predetermined parameter comprising a mass flow of NOx in the process gas at a location upstream of the selective catalytic reduction reactor indicative of an amount of NOx that needs to be removed from said process gas in the selective catalytic reduction reactor,
    estimating a rate of increase of said at least one predetermined parameter, and
    increasing, when said estimated rate of increase of said at least one predetermined parameter is positive, an amount being supplied of said reducing agent to a higher value than would be the case if said at least one predetermined parameter were to be kept constant at the estimated present value thereof.

2. The method according to claim 1, said method further comprising the step of comparing said estimated rate of increase of said at least one predetermined parameter to an upper limit value therefor, and increasing, when said estimated rate of increase of said at least one predetermined parameter exceeds said upper limit value thereof, the amount being supplied of said reducing agent to a higher value than would be the case if said at least one predetermined parameter were to be kept constant at the estimated present value thereof.

3. The method according to claim 1, wherein said at least one predetermined parameter is employed in a feed-forward mode for controlling the amount of the reducing agent supplied.

4. The method according to claim 1, wherein an effect of said increasing, when said estimated rate of increase of said at least one predetermined parameter is positive, the amount of said reducing agent supplied to a higher value than would be the case if said at least one predetermined parameter were to be kept constant at the estimated present value therefor, is later compensated for, when the amount of reducing agent supplied has been over supplied, by decreasing the amount of said reducing agent supplied to a lower value than would be the case if said at least one predetermined parameter were to be kept constant at the estimated present value thereof.

5. The method according to claim 1, wherein said estimating the rate of increase of said at least one predetermined parameter includes the step of calculating the derivative of said at least one predetermined parameter.

6. The method according to claim 1, said method further comprising the step of decreasing, when said estimated rate of increase of said at least one predetermined parameter is negative, the amount being supplied of said reducing agent to a lower value than would be the case if said at least one predetermined parameter were to be kept constant at the estimated present value thereof.

7. The method according to claim 6, said method further comprising the step of comparing said estimated rate of increase of said at least one predetermined parameter to a lower limit value therefor, and decreasing, when said estimated rate of increase of said at least one predetermined parameter is lower than the lower limit value thereof, the amount being supplied of said reducing agent to a lower value than would be the case if said at least one predetermined parameter were to be kept constant at the estimated present value thereof.

8. The method according to claim 1, wherein said at least one predetermined parameter is representative of the load on the process plant.

9. The method according to claim 8, wherein said controlling of the feeding of the reducing agent includes the steps of employing a relationship between the load on the process plant and the mass flow of NOx at a location upstream of the selective catalytic reduction reactor, such that a measurement of the load on the process plant can be converted to an expected mass flow of NOx to said location upstream of the selective catalytic reduction reactor, such that on the basis of said expected mass flow of NOx to said location upstream of the selective catalytic reduction reactor the amount of said reducing agent supplied may be adjusted.

10. The method according to claim 9, wherein a mathematical model of the relationship between the load on the process plant and the corresponding mass flow of NOx to a location upstream of the selective catalytic reduction reactor is employed.

11. A method of controlling feeding of a reducing agent, such as urea or ammonia, to a selective catalytic reduction reactor which is operative for removing NOx from a process gas of a process plant, such as a combustion plant or an incineration plant, said method of controlling the feeding of the reducing agent comprising the steps of:
estimating a present value of at least one predetermined parameter which is indicative of an amount of NOx that needs to be removed from said process gas in the selective catalytic reduction reactor,
estimating an estimated rate of increase of said at least one predetermined parameter,
comparing said estimated rate of increase of said at least one predetermined parameter to a lower limit value therefor, and
decreasing, when said estimated rate of increase of said at least one predetermined parameter is lower than the lower limit value thereof, the amount being supplied of said reducing agent to a lower value than would be the case if said at least one predetermined parameter were to be kept constant at the estimated present value thereof.

12. A device for controlling feeding of a reducing agent, such as urea or ammonia, to a selective catalytic reduction reactor which is operative for removing NOx from a process gas of a process plant, such as a combustion plant or an incineration plant, said controlling the feeding of the reducing agent comprising estimating a present value of at least one predetermined parameter which is indicative of an amount of NOx that needs to be removed from said process gas in the selective catalytic reduction reactor, said device for controlling comprising:
a controller which is operative for purposes of estimating a rate of increase of said at least one predetermined parameter, for increasing, when said estimated rate of increase of said at least one predetermined parameter is positive, an amount supplied of said reducing agent to a higher value than would be the case if said at least one predetermined parameter were to be kept constant at the estimated present value thereof, for comparing said estimated rate of increase of said at least one predetermined parameter to an upper limit value therefor, and for increasing, when said estimated rate of increase of said at least one predetermined parameter exceeds said upper limit value therefor, the amount supplied of said reducing agent to a higher value than would be the case if said at least one predetermined parameter were to be kept constant at the estimated present value thereof.

13. The device according to claim 12, wherein said controller is further operative for decreasing, when said estimated rate of increase of said at least one predetermined parameter is negative, the amount supplied of said reducing agent to a lower value than would be the case if said at least one predetermined parameter were to be kept constant at the estimated present value thereof.

14. A method of controlling feeding of a reducing agent, such as urea or ammonia, to a selective catalytic reduction reactor which is operative for removing NOx from a process gas of a process plant, such as a combustion plant or an incineration plant, said method of controlling the feeding of the reducing agent comprising the steps of:
estimating an estimated relevant value of at least one predetermined parameter which is indicative of an amount of NOx that needs to be removed from said process gas in the selective catalytic reduction reactor by employing a relationship between a load on the process plant and a mass flow of NOx at a location upstream of the selective catalytic reduction reactor, such that an estimation of the load on the process plant can be converted to an expected mass flow of NOx to said location upstream of the selective catalytic reduction reactor,
comparing said estimated relevant value of the at least one predetermined parameter to an upper limit value therefor, and
adjusting the amount of reducing agent supplied based on said expected mass flow of NOx or said estimated relative value of the at least one predetermined parameter according to said upper limit value therefor.

15. The method according to claim 14, wherein said relationship between the load on the process plant and the mass flow of NOx at said location upstream of the selective catalytic reduction reactor includes a mathematical model which is an approximation of the relation between the load on the process plant and the mass flow of NOx at said location upstream of the selective catalytic reduction reactor.

16. The method according to claim 14, wherein the load on the process plant is employed in a feed-forward mode for purposes of controlling the amount of said reducing agent supplied to the selective catalytic reduction reactor.

* * * * *